US011179674B2

(12) United States Patent
Münster-Swendsen et al.

(10) Patent No.: US 11,179,674 B2
(45) Date of Patent: Nov. 23, 2021

(54) PROCESS FOR THE REMOVAL OF DINITROGEN OXIDE IN PROCESS OFF-GAS

(71) Applicant: Haldor Topsøe A/S, Kgs. Lyngby (DK)

(72) Inventors: Janus Emil Münster-Swendsen, Espergærde (DK); Niklas Bengt Jakobsson, Kågeröd (SE)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/930,180

(22) Filed: May 12, 2020

(65) Prior Publication Data
US 2020/0368684 A1    Nov. 26, 2020

(30) Foreign Application Priority Data
May 21, 2019    (DK) .......................... PA 2019 00611

(51) Int. Cl.
F01N 13/00      (2010.01)
B01D 53/86      (2006.01)
B01D 53/90      (2006.01)
B01J 23/22      (2006.01)
B01J 23/34      (2006.01)
B01J 23/42      (2006.01)
B01J 23/44      (2006.01)
B01J 23/72      (2006.01)
B01J 29/76      (2006.01)
B01J 35/00      (2006.01)
B01J 35/04      (2006.01)

(52) U.S. Cl.
CPC ......... B01D 53/8628 (2013.01); B01D 53/90 (2013.01); B01J 23/22 (2013.01); B01J 23/34 (2013.01); B01J 23/42 (2013.01); B01J 23/44 (2013.01); B01J 23/72 (2013.01); B01J 29/7615 (2013.01); B01J 35/0006 (2013.01); B01J 35/04 (2013.01); F01N 13/009 (2014.06); F01N 13/0093 (2014.06); B01D 2251/208 (2013.01); B01D 2251/2062 (2013.01); B01D 2255/1021 (2013.01); B01D 2255/1023 (2013.01); B01D 2255/2073 (2013.01); B01D 2255/20723 (2013.01); B01D 2255/20761 (2013.01); B01D 2255/502 (2013.01); B01D 2255/902 (2013.01); B01D 2255/903 (2013.01); B01D 2257/402 (2013.01)

(58) Field of Classification Search
None
See application file for complete search history.

(56) References Cited

U.S. PATENT DOCUMENTS

| | | | | |
|---|---|---|---|---|
| 6,890,501 B2 * | 5/2005 | Delahay | ............. | B01D 53/8625 423/239.2 |
| 7,438,878 B2 | 10/2008 | Chen et al. | | |
| 8,329,127 B2 * | 12/2012 | Cox | ....... | B01J 29/072 423/213.2 |
| 2002/0044902 A1 | 4/2002 | Delahay et al. | | |
| 2002/0127163 A1 * | 9/2002 | Chen | .................. | B01D 53/8625 423/239.2 |
| 2006/0029535 A1 | 2/2006 | Ott | | |
| 2006/0051277 A1 | 3/2006 | Schwefer et al. | | |
| 2006/0277898 A1 * | 12/2006 | McCarthy, Jr. | ........ | F02D 41/021 60/286 |
| 2007/0149385 A1 * | 6/2007 | Liu | ....... | B01J 35/0006 502/60 |
| 2008/0044334 A1 * | 2/2008 | Pieterse | .................. | B01J 29/46 423/239.2 |
| 2008/0241034 A1 | 10/2008 | Schwefer et al. | | |
| 2010/0058746 A1 * | 3/2010 | Pfeifer | ...... | B01J 23/40 60/297 |
| 2014/0157763 A1 * | 6/2014 | Chandler | ............. | B01J 37/0009 60/299 |
| 2014/0356265 A1 * | 12/2014 | Chen | ..... | F01N 3/0222 423/212 |
| 2014/0363359 A1 * | 12/2014 | Schwefer | ............. | B01D 53/869 423/239.2 |
| 2015/0013310 A1 * | 1/2015 | Lambert | ................... | F01N 3/28 60/274 |
| 2015/0231565 A1 * | 8/2015 | Wittrock | ................. | F01N 3/103 423/212 |
| 2016/0367941 A1 * | 12/2016 | Gilbert | .................... | F01N 3/106 |
| 2017/0239619 A1 * | 8/2017 | Bauer | .................... | B01J 29/763 |
| 2017/0334722 A1 | 11/2017 | Schwefer et al. | | |

FOREIGN PATENT DOCUMENTS

| | | | |
|---|---|---|---|
| EP | 1 918 016 A1 | | 5/2008 |
| JP | H 09 884 A | | 1/1997 |
| WO | 2011092519 | * | 8/2011 |

* cited by examiner

Primary Examiner — Sheng H Davis
(74) Attorney, Agent, or Firm — Blank Rome LLP

(57) ABSTRACT

A process for the removal of nitrous oxide ($N_2O$) contained in a process off-gas in an axial flow reactor. The process includes the steps of (a) adding an amount of reducing agent into the process off-gas; (b) in a first stage passing in axial flow direction the process off-gas admixed with the reducing agent through a first monolithic shaped catalyst active in decomposing nitrous oxide by reaction with the reducing agent to provide a gas with a reduced amount of nitrous oxide and residual amounts of reducing agent; and (c) in a second stage passing the gas with a reduced amount of nitrous oxide and residual amounts of the reducing agent in axial flow direction through a second monolithic shaped catalyst active in oxidation of the residual amounts of the reducing agent.

16 Claims, No Drawings

PROCESS FOR THE REMOVAL OF DINITROGEN OXIDE IN PROCESS OFF-GAS

BACKGROUND OF THE INVENTION

1. Field of the Invention

The present invention relates to a process for the combined removal of nitrous oxide (dinitrogen oxide, $N_2O$) in process off-gas.

2. Description of the Related Art $N_2O$ is a powerful greenhouse gas and is therefore associated with a cost in areas with a CO2 market. Thus, the removal of the $N_2O$ needs to be performed as cost efficiently as possible.

Nitric acid production is an industry with known $N_2O$ emissions. Nitric acid production also has very strict requirements to ammonia ($NH_3$) slip from $N_2O$ removal due to the risks of ammonium nitrate forming in cold spots downstream the catalytic reactor. Slip requirement is typically 5 ppm or down to 3 or even 2 ppm.

The removal of the $N_2O$ needs to be done as cost efficiently as possible.

Nitric Acid ($HNO_3$) is mainly used for manufacturing of fertilizer and explosives.

It is produced via the Ostwald process, after the German chemist Wilhelm Ostwald. In this process ammonia (NH3) is oxidized to nitric oxide (NO). The nitric oxide is oxidized to nitrogen dioxide ($NO_2$) which is absorbed in water to form nitric acid. The process is pressurized and the off gas contains NOx and $N_2O$ but is otherwise very clean.

However, the oxidation of $NH_3$ to NO is not 100% selective, meaning that a certain amount of nitrogen ($N_2$) and dinitrogen oxide (nitrous oxide, $N_2O$) is also formed together with the desired NO.

Depending on the oxidation conditions, i.e. prevailing pressure, temperature and inflow velocity to the $NH_3$ combustion and also type and state of ageing of the catalyst, about 4-15 kg of $N_2O$ will typically be formed per metric ton of $HNO_3$. This results in typical $N_2O$ concentrations of about 500-2000 ppm by volume in the process off-gas.

The $N_2O$ formed is not absorbed during absorption of nitrogen dioxide ($NO_2$) in water to form nitric acid. Thus, $N_2O$ emits with the $HNO_3$ production process off-gas.

Since DeNOx stages installed downstream the absorption tower for reducing the residual content of NO and $NO_2$ (together referred to as NOx) generally do not bring about a reduction in the $N_2O$ content, the $N_2O$ finally emits into the atmosphere.

Since $N_2O$ is a potent greenhouse gas with some 300 times the effect of $CO_2$, and nitric acid plants now represent the single largest industrial process source of the former gas, $N_2O$ makes a considerable contribution to decomposing ozone in the stratosphere and to the greenhouse effect. For environmental protection reasons there is therefore an increasing need for technical solutions to the problem of reducing $N_2O$ emissions during nitric acid production and other industrial processes.

The known possible methods of lowering $N_2O$ emissions from $HNO_3$ plants can be categorized broadly into three groups:

Primary solution: $N_2O$ is prevented from being formed in the first place. This requires modifications to the platinum gauzes to reduce $N_2O$ formation. Alternative materials can be employed as the ammonia oxidation catalyst. For example, cobalt oxide, which does not generate significant amounts of $N_2O$ by-product, but suffers from being less selective for the production of NO.

Secondary solution: $N_2O$, once formed, is removed anywhere between the outlet of the ammonia oxidation gauzes and the inlet of the absorption tower. The position of choice for secondary methods is directly after the gauzes where the temperature is at its highest. Most technologies employ a catalyst in the form of pellets, either loose or enclosed in cages made of heat resistant wire, while some use honeycombs.

Tertiary solution: $N_2O$ is removed from the process off-gas downstream the absorption tower, either by catalytic decomposition to $N_2$ and $O_2$ or by catalytic reduction with a chemical reducing agent. The optimum position for locating a tertiary abatement step is typically at the hottest position downstream the absorption tower, immediately upstream of an expansion turbine. Known solution are using a pellet catalyst comprising an iron zeolite arranged with radial or horizontal flow through the catalyst beds to keep pressure drop to an acceptable level. This typically requires larger reactors.

The known tertiary catalyst units typically employ two beds: A first bed for removing bulk $N_2O$, then addition of a reducing agent, and a second bed for removing the remaining $N_2O$. The result is a very large and complex reactor with two radial flow beds and internal dosage of reducing agent. With the present invention, the same setup with two beds and internal dosing of reducing agent between the beds is then possible with a simpler and smaller reactor, thereby reducing overall complexity and costs.

Known tertiary catalyst units can also have only one bed with combined NOx and $N_2O$ removal, where the reducing agent is added upstream the tertiary reactor. Sufficient mixing is achieved by use of known methods of stationary mixers or simply by sufficient mixing length.

In order to obtain low emission of $N_2O$ and low slip of $NH_3$, a highly effective mixing of the $NH_3$ in the gas is required along with a larger catalyst volume to allow the reactions to take place.

In the reactors with radial or horizontal flow it is not possible to make a bottom layer with a different type of catalyst such as in the present invention. In the reactors with radial or horizontal flow it would have to be a separate bed, adding significant size and cost to the reactor.

Typically, $N_2O$ is removed in nitric acid tail gas by means catalyst pellets comprising an iron zeolite.

The reactors are designed with radial or horizontal flow through the catalyst beds in order to keep the pressure drop to an acceptable level. This typically requires larger reactor volumes.

Slip of ammonia reductant poses a security risk in nitric acid production, due to potential formation of ammonium nitrate in cold spots downstream or in the stack. Therefore, requirements to ammonia slip are typically very strict.

Processes using a hydrocarbon as reducing agent have typically lower activity and will therefore experience a significant slip of the used hydrocarbon along with partial combustion products such as CO. Methane frequently used in such processes as reducing agent is in itself a potent greenhouse gas, thereby to some extend offsetting the $N_2O$ emission reduction. Carbon monoxide is a toxic gas and emissions are therefore unwanted.

In order to obtain low emission of $N_2O$ and a low slip of reducing agent, highly effective mixing of the reducing agent in the gas is required along with a larger catalyst volume to allow the reactions to take place.

In the known reactors with radial or horizontal flow direction it is not possible to install a bottom layer with an ammonia slip catalyst.

When using ammonia as reducing agent, then in order for the N$_2$O decomposition reaction to be effective and result in a slip below 5 ppm ammonia or lower, a significant additional volume of catalyst is needed in those reactors.

In the process of the present invention, an additional catalytic stage is added, in which the reducing agent, such as ammonia, is oxidized.

This allows use of a lesser volume of catalyst active in the removal N$_2$O and a minor total catalyst volume resulting in more compact reactors and lower CAPEX.

The known processes for abatement of N$_2$O employ catalysts of the pellet-type in tertiary installations. These catalysts are typically installed in radial flow converters to keep the pressure drop down. Such radial flow converters are large and bulky, and they have many constraints regarding the design. As the reactor is typically pressurized, the cost of the reactor increases significantly with increasing diameter of the reactor. This is a well-known effect of pressurized vessels.

SUMMARY OF THE INVENTION

The present invention provides an improved process for the removal of nitrous oxide (N$_2$O) contained in a process off-gas in an axial flow reactor comprising the steps of
(a) adding an amount of reducing agent into the process off-gas;
(b) in a first stage passing in axial flow direction the process off-gas admixed with the reducing agent through a first monolithic shaped catalyst active in decomposing nitrous oxide with the reducing agent to provide a gas with a reduced amount of nitrous oxide and residual amounts of reducing agent; and
(c) in a second stage passing the gas with a reduced amount of nitrous oxide and residual amounts of the reducing agent in axial flow direction through a second monolithic shaped catalyst active in oxidation of the residual amounts of the reducing agent.

The term "removal nitrous oxide (N$_2$O)" should be understood as at least reducing the amounts of N$_2$O.

The term "monolithic shaped catalyst" should be understood as a monolithic or honeycomb shape containing or be coated with catalytic active material.

The monolithic shaped catalyst is preferably arranged orderly layered in one or more layers inside the reactor(s).

The monolithic shaped catalysts enable an axial flow reactor design, while at the same time providing a low pressure drop, compared to the radial flow reactor design with pellet catalysts.

The axial flow reactor can be designed with a smaller diameter than the radial flow reactors, keeping the costs of the reactor lower and making it possible for the reactor to be installed with less stringent requirements regarding installation space. Unlike the radial flow reactors designed for the use of catalyst pellets, the axial flow reactors can also be installed horizontally, making it possible to optimize the space demands for a given installation.

Optionally, a part of the N$_2$O can be removed in an upstream catalyst bed without injection of a reducing agent and the remaining amounts of N$_2$O are removed in a second down stream bed. The purpose of such arrangement is to reduce consumption of reducing agent for N$_2$O reduction as some N$_2$O decomposed thermally in the upstream bed.

Thus, in an embodiment of the invention, the process comprises the further step of passing the process off-gas in axial flow direction through a monolithic shaped catalyst active in the decomposition of nitrous oxide prior to step (a).

Preferably, the further step comprises a monolithic shaped catalyst active in the thermal decomposition of nitrous oxide comprises a metal exchanged zeolite, in which the metal comprises Fe, Co, Ni, Cu, Mn, Zn or Pd or mixtures thereof.

In an embodiment of the invention, the first monolithic shaped catalyst comprises a metal exchanged zeolite, in which the metal comprises Fe, Co, Ni, Cu, Mn, Zn or Pd or mixtures thereof.

Preferably, the metal exchanged zeolite is selected from the group consisting of MFI, BEA, FER, MOR, FAU, CHA, AEI, ERI and/or LTA.

Most preferred, the metal exchanged zeolite is Fe-BEA.

In an embodiment, the second monolithic shaped catalyst is selected from V, Cu, Mn, Pd, Pt or oxides thereof or combinations thereof.

In another embodiment, the second monolithic shaped catalyst comprises additionally one or more metal exchanged zeolites.

In further an embodiment of the invention, the first monolithic and the second monolithic shaped catalyst comprise an extruded monolithic shaped carrier, preferably cordierite.

In another preferred embodiment, the first and/or second monolithic shaped catalyst is arranged inside the reactor in more than one stacked layers.

In still an embodiment, the second monolithic shaped catalyst is arranged as zone coat on a monolithic shaped carrier.

In a preferred embodiment the reducing agent is ammonia or a precursor thereof.

In another embodiment, the reducing agent is a hydrocarbon, preferably methane.

In a further preferred embodiment, the first monolithic shaped catalyst is active both in decomposing nitrous oxide by reaction with ammonia and in selective catalytic reduction of NOx by reaction with ammonia.

The invention is further illustrated in the following detailed description of a specific embodiment thereof.

DETAILED DESCRIPTION OF THE PREFERRED EMBODIMENTS

A process according an embodiment of the invention is performed in a nitric acid process downstream of an absorption tower, after reheating of the process off-gas but before an expander. Ammonia is injected into the gas stream and mixed into the off-gas. The off-gas admixed with the ammonia enters a reactor with a first stage with the first monolithic shaped catalyst installed. In the first stage the N2O reacts with the ammonia according to the reaction:

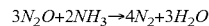

$$3N_2O+2NH_3\rightarrow 4N_2+3H_2O$$

NOx reacts by the well-known SCR reactions which also require ammonia. The catalyst volume in the first stage is such that the off-gas with significantly reduced NOx and N$_2$O and a NH$_3$ slip of around 10 ppm remains in the gas after the first stage.

This off-gas enters subsequently the second stage containing the second monolithic shaped catalyst where the majority of the ammonia slip is oxidized and thereby forms either N2 or NOx.

Any NOx being formed by the oxidation of the NH3 in the second stage is not a problem, as the NOX emission from the first stage is very low (almost 0 ppm) and the NH3 slip from the first stage into the second stage is still kept at a level so low, that reduced selectivity would still only lead to a limited NOx emission. Assuming a 10 ppm slip from the first stage and a selectivity of the second stage of 100% to NOx, then still only 10 ppm NOx is formed in the second stage.

Temperatures are typically in the range of 380–550° C. Pressure is typically in the range of 4-12 bar g, but can be both higher or lower. A higher pressure increases activity of NOx and N2o conversion in the first stage and it increases $NH_3$ conversion in the second stage.

Normal hourly space velocity of the first and second stage depends on temperature, pressure and required performance, but is typically in the range of 10000-40000 $h^{-1}$ in the first stage and 80000-120000 $h^{-1}$ in the second stage.

Typically, the catalyst volume of the first monolithic shaped catalyst employed in the first stage will be 3-5 times larger than the catalyst volume in the second stage.

In an embodiment, the second stage comprises catalyst active for NH3 oxidation along with catalyst active for SCR reactions. The second monolithic shaped catalyst has a similar composition to the first monolithic shaped catalyst in the first stage with the addition of a catalyst active for NH3 oxidation, such as Cu, Mn, Pd or Pt. Thereby, if NOx is formed by oxidation of NH3, the NOx can be removed by reaction with not yet converted NH3 on the catalyst active for SCR reactions thus further reducing NOx emissions.

If a catalyst similar to the catalyst of the first stage is also present in the second stage, then the reactions reducing the N2O will continue in the second stage also.

The second stage can optionally be performed with the second monolithic shaped catalyst arranged as zone coat on a monolithic shaped carrier.

As an example, when comparing a conventional installation to operating the first and second stage of the present invention, then the $N_2O$ reduction activity can be maintained with a significantly reduced catalyst volume. The first stage can be operated with an ammonia slip of for example 11 ppm and the second stage oxidizing the ammonia will then significantly reduce the ammonia slip to a level below the 5 ppm. The result is typically that the catalyst volume in the first stage can be reduced with about 40%, whereas the second stage typically requires less than 50% of the catalyst volume saved in the first bed, resulting in a total catalyst volume reduction in more than 20% with the present invention.

Additionally, by subsequently removing most of the ammonia slip from the first stage, the requirements to the mixing of ammonia with the off-gas are significantly reduced.

In a conventional reactor it is important to provide highly effective mixing of $NH_3$ and off-gas to obtain high degrees of NOx and $N_2O$ removal with a low slip of ammonia. When the mixing of the $NH_3$ with the off-gas is insufficient, there will be regions where there is not enough $NH_3$, meaning that NOx and N2O conversion will suffer in these regions and there will be regions with too much $NH_3$ meaning that there will be a higher slip from these regions. To obtain high conversion of NOx and $N_2O$ in combination with a low slip of $NH_3$, very good mixing is required. Static mixers are typically required, causing additional cost and pressure drop in the installation.

By the invention, slightly higher amounts of $NH_3$ can be dosed into the off-gas so that the average $NH_3$ slip from the first stage is for instance 10 ppm instead of 2 ppm if that is the requirement to avoid ammonium sulfate formation in cold spots downstream the catalytic NOx and $N_2O$ conversion.

The oxidation of $NH_3$ in the second stage is independent of the presence of NOx and $N_2O$. Further, the oxidation of $NH_3$ is about first order so at a given catalyst volume, the oxidation of ammonia is substantially constant in the second stage. This means that a greater $NH_3$ slip from the first stage will result in that more $NH_3$ is removed in the second stage (the percentage conversion is more or less the same) and the overall slip from the second stage will be lower and less variable.

The invention claimed is:

1. A Process for the removal of nitrous oxide (N2O) contained in an off-gas from the manufacture of nitric acid, the process being performed in an axial flow reactor and comprising the steps of:
    (a) adding an amount of reducing agent into the off-gas from the manufacture of nitric acid;
    (b) in a first stage, passing in axial flow direction the off-gas from the manufacture of nitric acid admixed with the reducing agent through a first monolithic shaped catalyst having a composition active in decomposing nitrous oxide with the reducing agent to provide a gas with a reduced amount of nitrous oxide and residual amounts of reducing agent; and
    (c) in a second stage, passing the gas with a reduced amount of nitrous oxide and NOx and residual amounts of the reducing agent in axial flow direction through a second monolithic shaped catalyst having the same composition active in decompositing nitrous oxide as the composition of the first monolithic shaped catalyst to further reduce the amount of nitrous oxide in the gas, with the addition of an oxidation catalyst for oxidizing the residual amounts of the reducing agent, the first monolithic shaped catalyst having a catalyst volume 3-5 times larger than the catalyst volume of the second monolithic shaped catalyst.

2. The process according to claim 1, comprising the further step of passing the process off-gas in axial flow direction through a third monolithic shaped catalyst active in the decomposition of nitrous oxide prior to step (a).

3. The process according to claim 2, wherein the third monolithic shaped catalyst active in the decomposition of nitrous oxide comprises a metal exchanged zeolite, in which the metal comprises Fe, Co, Ni, Cu, Mn, Zn or Pd or mixtures thereof.

4. The process according to claim 1, wherein the first monolithic shaped catalyst comprises a metal exchanged zeolite, in which the metal comprises Fe, Co, Ni, Cu, Mn, Zn or Pd or mixtures thereof.

5. The process according to claim 4, wherein the metal exchanged zeolite is selected from the group consisting of MFI, BEA, FER, MOR, FAU, CHA, AEI, ERI and/or LTA.

6. The process according to claim 4, wherein the metal exchanged zeolite is Fe-BEA.

7. The process according to claim 1, wherein the second monolithic shaped catalyst is selected from V, Cu, Mn, Pd, Pt or oxides thereof or combinations thereof.

8. The process according to claim 1, wherein the first monolithic and second monolithic shaped catalyst comprise an extruded monolithic shaped carrier.

9. The process according to claim 8, wherein the extruded monolithic shaped carrier consists of cordierite.

10. The process according to claim 1, wherein, in step (b), the process off-gas admixed with the reducing agent is passed through stacked layers of the first monolithic shaped catalyst.

11. The process according to claim 1, wherein the second monolithic shaped catalyst comprises a monolithic shaped carrier zone coated with catalyst.

12. The process according to claim 1, wherein the reducing agent is ammonia.

13. The process according to according to claim 12, wherein the first monolithic shaped catalyst is active both in decomposing nitrous oxide by reaction with ammonia and in selective catalytic reduction of NOx by reaction with ammonia.

14. The process according to claim 1, wherein the reducing agent is a precursor of ammonia.

15. The process according to claim 1, wherein the reducing agent is a hydrocarbon.

16. The process according to claim 1, wherein the reducing agent is methane.

* * * * *